United States Patent
Bunn et al.

(10) Patent No.: US 7,388,884 B2
(45) Date of Patent: Jun. 17, 2008

(54) CABLE MODEM SYSTEM AND METHOD FOR SPECIALIZED DATA TRANSFER

(75) Inventors: Fred Bunn, Roswell, GA (US); Tom Johnson, Gainesville, GA (US)

(73) Assignee: Broadcom Corporation, Irvine, CA (US)

(*) Notice: Subject to any disclaimer, the term of this patent is extended or adjusted under 35 U.S.C. 154(b) by 794 days.

(21) Appl. No.: 09/783,403

(22) Filed: Feb. 15, 2001

(65) Prior Publication Data

US 2001/0053159 A1 Dec. 20, 2001

(51) Int. Cl.
*H04J 3/24* (2006.01)
*H04N 7/16* (2006.01)
*H04J 3/18* (2006.01)
*G06F 15/16* (2006.01)

(52) U.S. Cl. .............. 370/474; 370/477; 709/247; 725/116

(58) Field of Classification Search ................ 370/389, 370/401, 465–467, 469–471, 475, 477, 395.5–395.6; 709/223–232, 245–247; 713/201
See application file for complete search history.

(56) References Cited

U.S. PATENT DOCUMENTS

| | | | |
|---|---|---|---|
| 4,534,024 A | 8/1985 | Maxemchuk et al. |
| 4,712,210 A | 12/1987 | Davis et al. |
| 5,341,374 A | 8/1994 | Lewen et al. |
| 5,421,030 A | 5/1995 | Baran |
| 5,425,027 A | 6/1995 | Baran |
| 5,469,495 A | 11/1995 | Beveridge |
| 5,515,379 A | 5/1996 | Crisler et al. |
| 5,539,449 A | 7/1996 | Blahut et al. |
| 5,570,355 A | 10/1996 | Dail et al. |
| 5,606,561 A | 2/1997 | Scheibel, Jr. et al. |
| 5,742,592 A | 4/1998 | Scholefield et al. |
| 5,756,280 A | 5/1998 | Soora et al. |
| 5,850,400 A | 12/1998 | Eames et al. |
| 5,963,557 A | 10/1999 | Eng |

(Continued)

FOREIGN PATENT DOCUMENTS

WO WO 99/45678 9/1999

OTHER PUBLICATIONS

Sumner, Mark, "DOCSIS 1.1 Overview," CableLabs, http://www.cablemodem.com, May 3-7, 1999, Copyright 1999, pp. 1-16.

(Continued)

*Primary Examiner*—Wing Chan
*Assistant Examiner*—Gregory B. Sefcheck
(74) *Attorney, Agent, or Firm*—Sterne, Kessler, Goldstein & Fox P.L.L.C.

(57) ABSTRACT

A cable modem system and method is provided for the transfer and processing of data in accordance with specialized data transfer protocols while utilizing conventional cable modem termination system (CMTS) equipment. A cable modem system in accordance with the invention includes a cable modem that provides for the modification of data packets in accordance with a proprietary protocol and the addressing of the modified data packets to a headend server. The headend server is adapted to reconstruct the data packets for transmission to other local cable modems or to a packet-switched network. In additional embodiments, the CMTS itself rather than a headend server operates to reconstruct the data packets.

12 Claims, 4 Drawing Sheets

U.S. PATENT DOCUMENTS

| | | |
|---|---|---|
| 5,982,780 A | 11/1999 | Bohm et al. |
| 6,032,197 A * | 2/2000 | Birdwell et al. ............. 709/247 |
| 6,055,268 A | 4/2000 | Timm et al. |
| 6,185,224 B1 | 2/2001 | Limb et al. |
| 6,230,326 B1 * | 5/2001 | Unger et al. ................ 725/111 |
| 6,233,687 B1 * | 5/2001 | White ........................ 713/201 |
| 6,259,695 B1 | 7/2001 | Ofek |
| 6,438,123 B1 * | 8/2002 | Chapman ................... 370/351 |
| 6,466,986 B1 * | 10/2002 | Sawyer et al. ............... 709/245 |
| 6,510,162 B1 * | 1/2003 | Fijolek et al. ............... 370/432 |
| 6,580,730 B1 | 6/2003 | Loukianov |
| 6,618,386 B1 * | 9/2003 | Liu et al. .................... 370/401 |
| 6,643,780 B1 * | 11/2003 | Cooper ....................... 713/201 |
| 6,715,075 B1 * | 3/2004 | Loukianov ................. 713/176 |
| 6,732,179 B1 * | 5/2004 | Brown et al. ................ 709/229 |
| 6,788,707 B1 * | 9/2004 | Horton et al. ............... 370/474 |
| 6,804,251 B1 | 10/2004 | Limb et al. |
| 6,963,931 B2 * | 11/2005 | Bunn et al. ................. 709/246 |
| 7,130,314 B2 * | 10/2006 | Bunn et al. ................. 370/474 |
| 7,203,164 B2 * | 4/2007 | Gummalla et al. .......... 370/230 |
| 2001/0030975 A1 * | 10/2001 | Limb et al. ................. 370/465 |

OTHER PUBLICATIONS

International Search Report, Application No. PCT/US01/04818, issued Aug. 14, 2001, 3 pages.

John O. Limb and Dolors Sala, "A Protocol for Efficient Transfer of Data over Hybrid Fiber/Coax Systems," article in *IEEE/ACM Transactions on Networking*, vol. 5, No. 6, pp. 872-881, Dec. 1997.

* cited by examiner

CABLE MODEM SYSTEM AND METHOD FOR SPECIALIZED DATA TRANSFER

CROSS-REFERENCE TO RELATED APPLICATIONS

This application is related to the following non-provisional applications, all having the same filing date as the present application:

"Method, System and Computer Program Product for Scheduling Upstream Communications", U.S. Pat. Ser. No. 09/783,404, by Gunimalla et al. (incorporated by reference in its entirety herein).

"System And Method For Combining Requests For Data Bandwidth By A Data Provider For Transmission Of Data Over An Asynchronous Communication Medium," U.S. Pat. Ser. No. 09/783,311, by Gummalla et al., (incorporated by reference in its entirety herein). "Voice Architecture For Transmission Over A Shared, Contention Based Medium," U.S. Pat. Ser. No. 09/785,020, by Gunimalla et al. (incorporated by reference in its entirety herein).

"System and Method for Suppressing Silence in Voice Traffic over an Asynchronous Communication Medium," U.S. Pat. Ser. No. 09/783,405, by Gunimalla et al., (incorporated by reference in its entirety herein).

BACKGROUND OF THE INVENTION

1. Field of the Invention

The present invention is related to cable modem systems. In particular, the present invention is related to a cable modem system and method for data transfer.

2. Background

Conventional cable modem systems utilize DOCSIS-compliant equipment and protocols to transfer data between one or more cable modems (CM) and a cable modem termination system (CMTS). DOCSIS (Data Over Cable System Interface Specification) generally refers to a group of specifications that define industry standards for cable headend and cable modem equipment. In part, DOCSIS sets forth requirements and objectives for various aspects of cable modem systems including operations support systems, management, data interfaces, as well as network layer, data link layer, and physical layer transport for cable modem systems.

At a high level, DOCSIS comprises a four-way handshake protocol with the following message exchange: (1) request for bandwidth for data transmission by a cable modem, (2) grant of request by the CMTS, (3) upstream slot specification by the CMTS, and (4) subsequent data transmission by the cable modem. Both slot specification and grant messages are encapsulated in a single DOCSIS message known as the MAP, which in fact includes all feedback from the CMTS to cable modems related to the normal mode of operation of the DOCSIS protocol.

After the grant from the CMTS has been received by the cable modem, the upstream channel may be viewed as a continuous flow of mini-slots that may be used to transmit data in ways that depart from, and are more efficient than, standard DOCSIS protocols. For example, voice and data packets may be processed by the cable modem to reduce the number of bits transferred per packet through the elimination of protocol overhead. In particular, a proprietary protocol-specific header compression technique may be used to reduce the size of various protocol headers within a given DOCSIS packet. The use of a protocol-specific header compression technique presents a distinct advantage over DOCSIS 1.0, which does not provide for header suppression, as well as over DOCSIS 1.1, which only permits header suppression based on the presence of redundant bit sequences in sequentially-transmitted packets.

Techniques that reduce the number of bits transferred per packet as described above require additional processing by the CMTS to reconstruct the original DOCSIS packet and the protocol headers included therein so that the packet may be properly handled at the cable headend. However, conventional CMTS equipment does not provide for such additional processing capabilities. Moreover, the cost of replacing or upgrading existing CMTS equipment to provide for these capabilities may be prohibitively expensive. Accordingly, what is desired is a cable modem system and method for data transfer that provides for specialized headend processing of modified DOCSIS packets while utilizing existing conventional CMTS equipment with little or no modification.

BRIEF SUMMARY OF THE INVENTION

The present invention is directed to a cable modem system for transferring data from a user device to a network comprising a cable modem, a cable modem termination system coupled to the cable modem via a cable network, and a headend server coupled to the cable modem termination system and to the network. The cable modem receives data packets from the user device, modifies the contents of the data packets in accordance with a data transfer protocol, and transfers the modified data packets to the cable modem termination system. The cable modem termination system receives the modified data packets and transfers the modified data packets to the headend server. The headend server restores the contents of the modified data packets to an unmodified state and transfers the restored data packets to the network.

In embodiments of the present invention, the cable modem also appends address information to the modified data packets, and the cable modem termination system transfers the modified data packets to the headend server only when the address information comprises the address of the headend server. In further embodiments, the address information comprises an Ethernet address, and the network comprises the Internet. In still further embodiments, the data transfer protocol is a header suppression scheme.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

Figure 1:
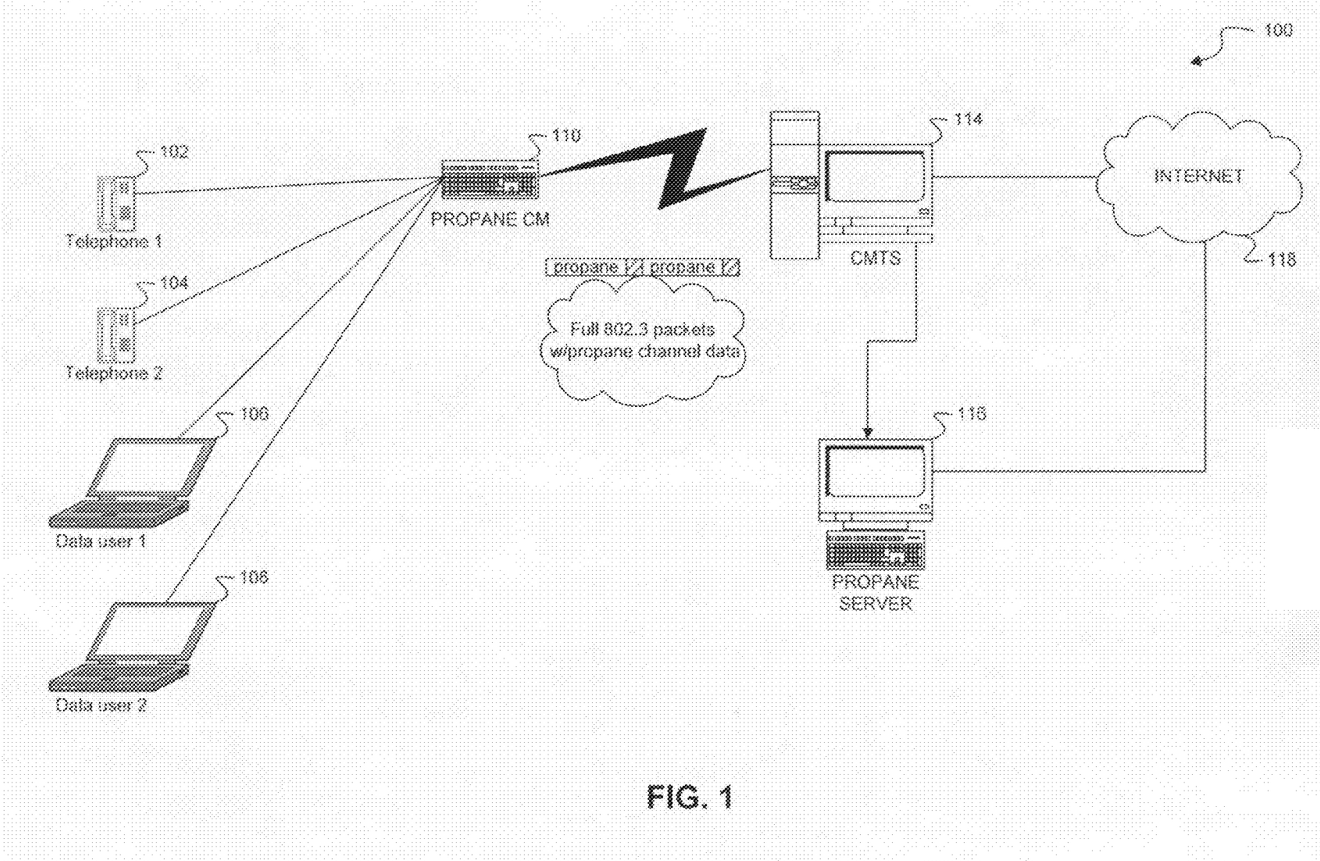
FIG. 1 is a high level block diagram of a cable modem system in accordance with embodiments of the present invention.

A. Cable Modem System in accordance with Embodiments of the Present Invention
B. Modification and Reconstruction of Data Packets in Accordance with Embodiments of the Present Invention
C. Specialized Data Transfer Protocols in Accordance with Embodiments of the Present Invention
D. Alternate Modulation/Demodulation Systems in Accordance with an Embodiment of the Present Invention
E. Conclusion A. Cable Modem System in Accordance with Embodiments of the Present Invention FIG. 1 is a high level block diagram of an example cable modem system 100 in accordance with embodiments of the present invention. Cable modem system 100 includes a cable modem 110, a cable network 112, a cable modem termination system (CMTS) 114, and a headend server 116.

The cable modem 110 operates as an interface between a plurality of attached user devices and the cable network 112 and permits the user devices to send and receive data over the cable network 112. In the cable modem system 100, the user devices include a first telephone 102, a second telephone 104, a first data user 106 and a second data user 108. In embodiments, first and second telephones 102 and 104 comprise VoIP-enabled phones adapted for voice communication over a packet-switched network. In embodiments, first data user 106 and second data user 108 comprise a personal computer, data terminal equipment, or any other user device capable of running applications that send and receive data over a packet-switched network. In the example cable modem system 100, only one cable modem 110 and four user devices 102, 104, 106 and 108 are shown for clarity. In general, any number of cable modems and any number of user devices can be included in the cable modem system of the present invention.

The cable network 112 connects the cable modem 110 to the CMTS 114 and permits the transfer of data between these system elements. In embodiments, the cable network 112 can comprise coaxial cable, fiberoptic cable, or a combination of coaxial cable and fiberoptic cable linked via a fiber node.

The CMTS 114 is a headend element that controls the upstream and downstream transfer of data between itself and cable modem 110, as well as any other cable modems to which it may be attached by means of the cable network 112. In embodiments of the present invention, the CMTS 114 comprises DOCSIS-compliant hardware and software that controls the transfer of data between itself and cable modem 110 in accordance with the DOCSIS specifications. Accordingly, the CMTS 114 engages in a four-way handshake protocol with the cable modem 110 that includes the following message exchange: (1) request for bandwidth for data transmission by the cable modem 110, (2) grant of request by the CMTS 114, (3) upstream slot specification by the CMTS 114, and (4) subsequent data transmission by the cable modem 110. Both slot specification and grant messages are encapsulated in a single DOCSIS message known as the MAP, which in fact includes all feedback from the CMTS 114 to the cable modem 110 related to the normal mode of operation of the DOCSIS protocol.

The CMTS 114 also acts as an interface between the cable network 112 and the Internet 118 and processes data received from the cable modem 110 that is directed to the Internet for transfer to the Internet 118. As will be discussed in more detail below, in embodiments of the present invention, the CMTS 114 will forward certain types of data received from the cable modem 110 to the headend server 116 for additional processing before the data may be transferred to the Internet 118. The CMTS 114 also acts as an interface between cable modem 110 and other cable modems on the cable network 112. For example, the CMTS 114 can transfer data between cable modem 110 and another cable modem (not shown) on the cable network 112.

B. Modification and Reconstruction of Data Packets in Accordance with Embodiments of the Present Invention In accordance with the present invention, the cable modem 110 and the headend server 116 are adapted to send and receive data, respectively, in proprietary formats that deviate from standard DOCSIS protocols. In embodiments, the cable modem 110 is adapted to modify data packets in accordance with a proprietary header compression scheme prior to transmission over the cable network 112, and the headend server 116 is adapted to reconstruct the modified DOCSIS packets that are received from the cable modem 110 via the cable network 112 and the CMTS 114.

Figure 2:
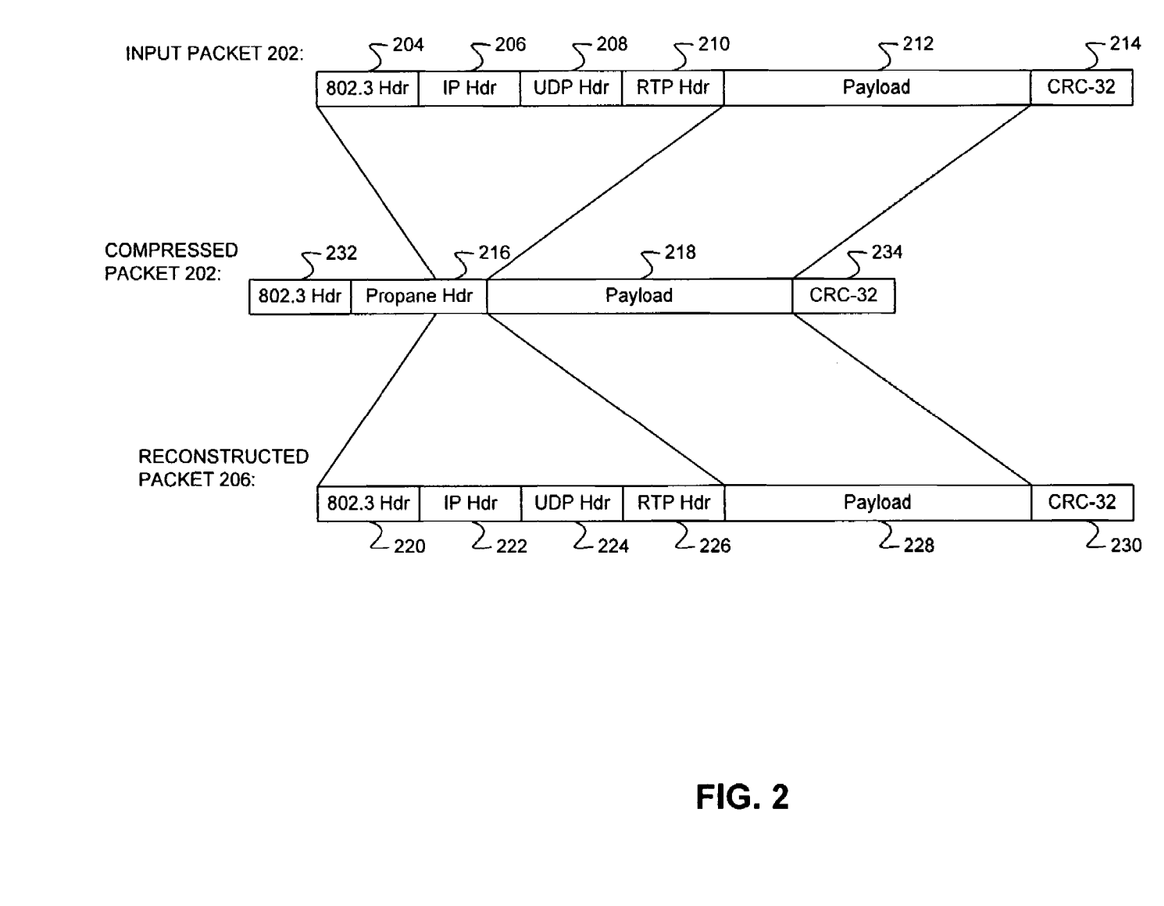
FIG. 2 depicts various packet formats used for the transfer of data in a cable modem system in accordance with embodiments of the present invention.

FIG. 2 is useful for explaining a manner in which packets are modified by the cable modem 110 and reconstructed by the headend server 116 in accordance with embodiments of the present invention. More specifically, FIG. 2 illustrates an input packet 202, a compressed packet 204, and a reconstructed packet 206 in accordance with embodiments of the present invention.

Input packet 202 represents a data packet generated by a user device for transmission over the cable network 112. The input packet 202 includes an 802.3 header 204, an IP header 206, a UDP header 208, an RTP header 210, a data payload 212, and a CRC field 214.

In embodiments, the input packet 202 can be generated by an application program running on the first data user 106 described above in reference to FIG. 1. For example, an application program running on the first data user 106 may generate voice or data information for transmission over the cable network 112 to a local cable modem or to the Internet. This voice or data information comprises the data payload 212 of the input packet 202. An application program or operating system routine running on the on the first data user 106 will append the IP header 206, UDP header 208, RTP header 210 and CRC field 214 to the data payload so that it may be transmitted in accordance with standard IP protocols. An Ethernet card within the first data user 106 will further append the 802.3 header to the packet so that the input packet may be transmitted in accordance with standard Ethernet protocols.

The input packet 202 is transmitted to the cable modem 110, which determines whether or not the header information in the input packet 202 may be suppressed in accordance with a proprietary header suppression scheme. In embodiments, the proprietary header suppression scheme is a protocol-specific header suppression scheme that predictively modifies header fields based on an a priori knowledge of the various protocols with which the headers are associated.

If the header information may be suppressed, the cable modem 110 will suppress the 802.3 header 204, the IP header 206, the UDP header 208 and the RTP header 210. In an embodiment, all of the 802.3, IP, UDP and RTP headers are eliminated and replaced with a single byte reconstruction index. In the instance where the input packet 202 is a voice packet (i.e., the payload 212 is a voice payload), this scheme yields a 14-byte advantage per voice packet over the DOCSIS 1.1 header suppression technique.

By performing header suppression on the input packet 202, the cable modem generates a "compressed" data packet 204 for transmission over the DOCSIS network. As shown in FIG. 2, the compressed data packet 204 includes a new 802.3 header 232, a proprietary header 216, a payload 218, and a new CRC field 234. In embodiments, the payload 212 is not compressed and therefore the payload 218 is identical to the payload 212 of the input packet 202.

The proprietary header 216 includes information that indicates to a recipient of the compressed packet how to reconstruct it. In embodiments, this information includes an identification of the cable modem from which the compressed packet 204 has been transmitted.

In addition to performing header suppression on the input packet 202, the cable modem 110 also places a new 802.3 header 232 on the compressed packet 204. The new 802.3 header is necessary to address the compressed packet 204 to the headend server 116 which will reconstruct the compressed packet 204 in accordance with the proprietary header suppression protocol. By appending the new 802.3 header 232 addressed to the headend server 116 onto the compressed packet 204, the cable modem 110 assures that the compressed packet 204 will be passed to the headend server 116 by the CMTS 114 for the necessary additional processing instead of being processed by the CMTS 114 and transmitted to the Internet 118.

In an alternate embodiment, the headend server 116 may not be directly connected to the CMTS 114 but instead be connected via the Internet 118. In such an alternate embodiment, the cable modem 110 would have to place a new IP address on the front of the compressed data packet 204 in addition to the new 802.3 header 232 in order to address compressed data packets to the headend server. The present invention is directed to such an alternative embodiment.

The headend server 116 is adapted to reconstruct the compressed data packet 204 in accordance with the proprietary header suppression protocol to generate a reconstructed data packet 206. As shown in FIG. 2, a portion of the proprietary header 216 from the compressed packet 204 is expanded into a standard 802.3 header 220, an IP header 222, a UDP header 224 and an RTP header 226 in the reconstructed packet 206. These headers are identical to the 802.3 header 204, IP header 206, UDP header 208 and RTP header 210 of the input packet 202. The headend server 116 also generates a new CRC field 230. The payload 228 of the reconstructed packet 206 is identical to the payload of the compressed packet 204.

After the headend server 116 has generated the reconstructed packet 206, it can send it back to the CMTS 114 for transfer to another cable modem on the cable network 112 or to the Internet 118, or the headend server 116 can transfer the reconstructed packet 206 directly to the Internet 118.

Figure 3:
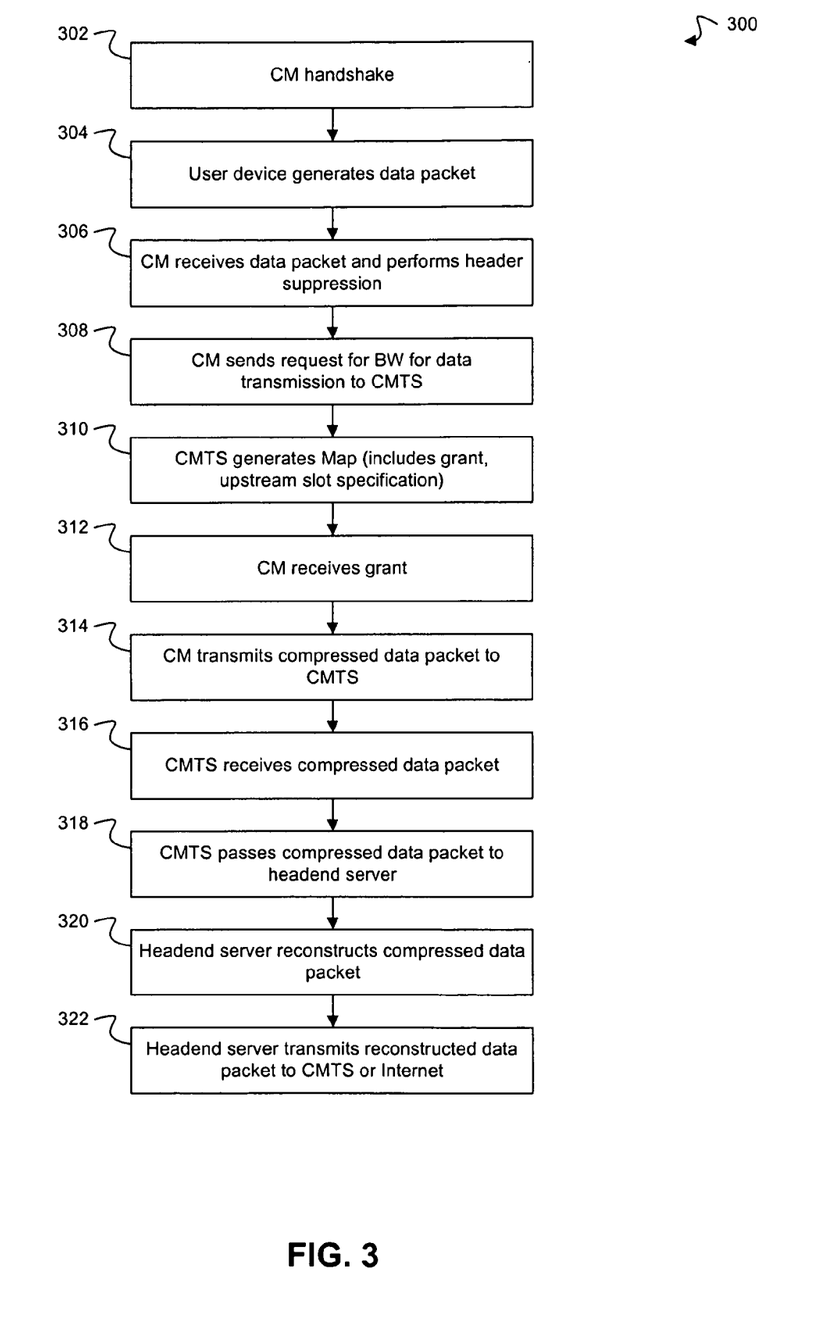
FIG. 3 is a flowchart of a method for specialized data transfer in a cable modem system in accordance with embodiments of the present invention.

C. Specialized Data Transfer Protocols in Accordance with Embodiments of the Present Invention FIG. 3 depicts a flowchart 300 of a method for specialized data transfer in a cable modem system in accordance with embodiments of the present invention. The invention, however, is not limited to the description provided by the flowchart 300. Rather, it will be apparent to persons skilled in the art from the teachings provided herein that other functional flows are within the scope and spirit of the present invention. The flowchart 300 will be described with continued reference to the example cable modem system 100 of FIG. 1.

At step 302, the cable modem 110 is turned on and initiates a handshaking routine with the CMTS 114 via the cable network 112 to inform the CMTS 114 that the cable modem 110 is now present and active on the cable network 112.

During the handshaking process, the cable modem 110 downloads a configuration file from the CMTS 114 that includes the address information for the headend server 116. The cable modem 110 then sends identification and configuration information to the headend server 116 using standard DOCSIS packets. In response, the headend server 116 allocates internal memory that is used to store configuration information for the cable modem 110. In embodiments, the headend server 116 also allocates internal memory that is used to store packets received from the cable modem 110. Previously received packet information can be used by the headend server 116 to reconstruct compressed packets received from the cable modem 110, where the compression scheme is based in part on sending only incremental changes to the fields of a packet.

At step 304, a user device (e.g., first telephone 102, second telephone 104, first data user 106, or second data user 108) generates a data packet for transmission over the cable network 112. In embodiments, the data packet may comprise the input packet 202 of FIG. 2.

At step 306, the cable modem 110 receives the data packet from the user device and performs header suppression as appropriate in accordance with a proprietary header suppression routine as described in more detail in reference to FIG. 2, above. The cable modem 110 thereby generates a compressed data packet with a new 802.3 header address that directs the compressed data packet to the headend server 116. In embodiments, the compressed data packet may comprise the compressed data packet 204 of FIG. 2.

At step 308, the cable modem 110 sends a request for bandwidth for data transmission to the CMTS 114 in accordance with the DOCSIS protocol.

At step 310, the CMTS 114 generates a MAP that grants the request and provides upstream slot specification to the cable modem 110.

At step 312, the cable modem 110 receives the grant via the MAP message from the CMTS 114.

At step 314, the cable modem 110 utilizes its slot to transmit the compressed data packet to the CMTS 114.

At step 316, the CMTS 114 receives the compressed data packet and examines the new 802.3 header. Because the new 802.3 header is addressed to the headend server 116, the CMTS 114 will pass the compressed data packet to the headend server 116 instead of processing it as a standard DOCSIS packet, as shown at step 318.

At step 320, the headend server 116 receives the compressed data packet, removes the new 802.3 header, and reconstructs the compressed data packet to generate a reconstructed data packet in accordance with a proprietary header suppression protocol. In embodiments, the reconstructed data packet comprises the reconstructed data packet 206 of FIG. 2.

At step 322, the headend server 116 sends the reconstructed data packet back to the CMTS 114 for transfer to another cable modem on the cable network 112 or to the Internet 118, or the headend server 116 can transfer the reconstructed packet 206 directly to the Internet 118.

D. Alternate Cable Modem System Embodiments in Accordance with the Present Invention The example cable modem system and methods described above provide for the transfer and headend processing of data in accordance with specialized data transfer protocols while utilizing conventional cable modem termination system (CMTS) equipment and software. Because the above described system and methods utilize an Ethernet-addessable headend server to perform reconstruction of data packets modified in accordance with a proprietary data transfer protocol, no modification of CMTS equipment or software is required. It should be noted that where a CMTS includes a router that directly passes packets to the Internet backbone, some software modification may be required to redirect compressed packets to the headend server. However, such software modification would be very minimal and inexpensive.

An alternate cable modem system embodiment in accordance with the present invention utilizes CMTS software components to perform the reconstruction functions described above in regard to the headend server 116 of FIG. 1. Such a configuration would provide for improved bandwidth utilization on the cable network.

Figure 4A:
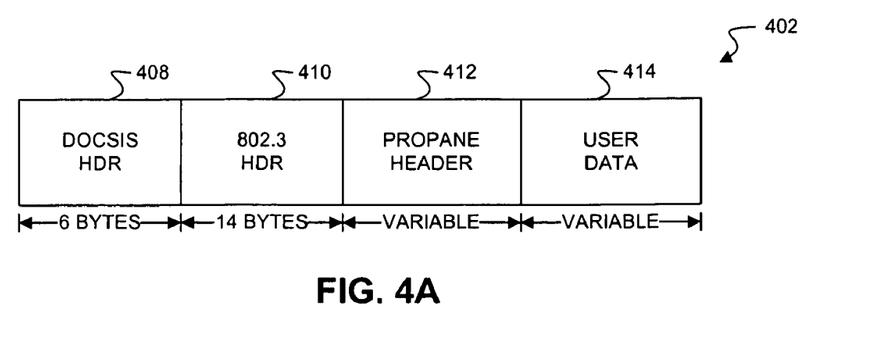
FIG. 4A depicts a packet format used for data transfer in a cable modem system in accordance with an embodiment of the present invention.

For example, FIG. 4A depicts an example packet layout 402 for a compressed packet sent in accordance with the cable modem system 100 of FIG. 1 and/or in accordance with the method of FIG. 3. In other words, FIG. 4A depicts an example packet layout 402 for a compressed packet sent in accordance with a cable modem system in which the reconstruction of compressed packets is performed by a specialized headend server as opposed to by the CMTS itself. The packet 402 includes a 6-byte DOCSIS header 408 for compatibility with CMTS hardware, an 8-byte 802.3 header for addressing the specialized headend server, a variable-length proprietary header 412 that contains the compressed header information, and a variable-length user data field 414.

Figure 4B:
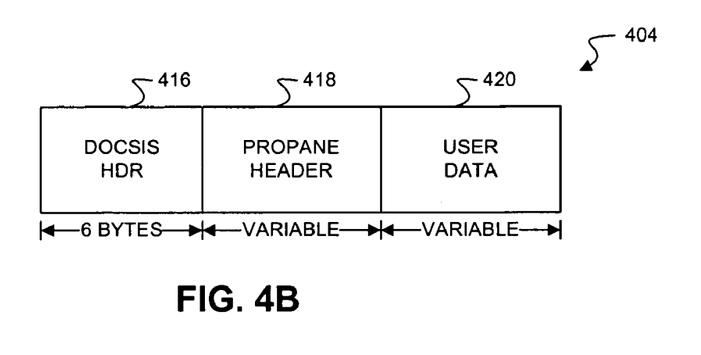
FIG. 4B depicts a packet format used for data transfer in a cable modem system in accordance with an alternate embodiment of the present invention.

In contrast, FIG. 4B depicts an example packet layout 404 for a compressed packet sent in accordance with a cable modem system in which the CMTS software components, as opposed to the headend server, perform the reconstruction of compressed packets. The packet 404 still requires a DOCSIS header 416 for compatibility with CMTS hardware, and, like the packet 402, the packet 404 includes a variable-length proprietary header 418 that contains the compressed header information, and a variable-length user data field 420. However, the packet 404 does not require a 802.3 header because a specialized headend server is not used in this configuration. Thus, a 14-byte savings is acheived.

Figure 4C:
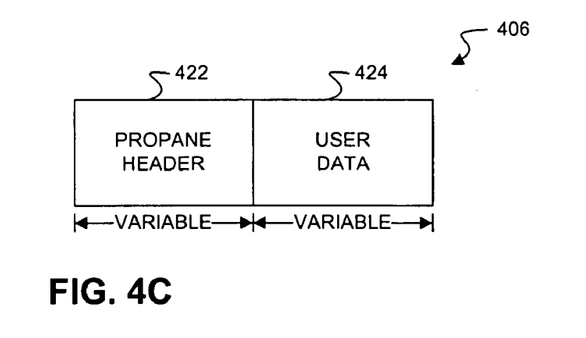
FIG. 4C depicts a packet format used for data transfer in a cable modem system in accordance with an alternate embodiment of the present invention.

Further improvements in bandwidth utilization may be achieved where a cable modem system in accordance with the invention utilizes both the CMTS hardware and software, as opposed to just the CMTS software, to perform the reconstruction of compressed packets. FIG. 4C depicts an example packet format 406 for a compressed packet in accordance with such a configuration. As can be seen in FIG. 4C, because the hardware of the CMTS has been modified, the CMTS may receive packets without a DOCSIS header. Thus, the packet 406 consists only of a variable-length proprietary header 422 that contains the compressed header information, and a variable-length user data field 424.

Each of the above configurations is achievable even within the confines of a DOCSIS-compliant system, because DOCSIS is designed to accommodate upstream transmissions from cable modems to the headend on a shared and scheduled medium. More specifically, DOCSIS requires the CMTS to determine the configuration of cable modems that are active on the cable network and to allocate predetermined slots of bandwidth to each modem in response to requests from each cable modem. Accordingly, the CMTS will have the necessary advance information to determine how to handle packets originating from each cable modem on its local cable network, and be able to process them accordingly. Thus, embodiments of the present invention permit the use of proprietary data transfer algorithms that may vary from modem to modem by allowing the headend equipment to receive modified DOCSIS packets in a DOCSIS-compliant manner.

E. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A cable modem system for transferring data from a user device to a network, comprising:
    a cable modem;
    a DOCSIS-compliant cable modem termination system coupled to said cable modem via a cable network; and
    a headend server coupled to said cable modem termination system and to the network;
    wherein said cable modem comprises means to receive data packets from the user device, to modify the contents of said data packets, said modification comprising suppression of an RTP header, in accordance with a non-DOCSIS-compliant data transfer protocol, to append a unique hardware address of said headend server to said modified data packets, and to transfer said modified data packets to said cable modem termination system;
    wherein said cable modem termination system comprises means to receive said modified data packets and to transfer said modified data packets to said headend server in accordance with said unique hardware address; and
    wherein said headend server comprises means to restore the contents of said modified data packets to an unmodified state and to transfer said restored data packets to the network.

2. The cable modem system of claim 1, wherein said unique hardware address comprises an Ethernet address.

3. The cable modem system of claim 1, wherein the network comprises the Internet.

4. The cable modem system of claim 1, wherein said cable modem comprises means to modify the contents of said data packets by suppressing header information in said data packets, and said headend server comprises means to restore the contents of said modified data packets to an unmodified state by restoring said suppressed header information.

5. A cable modem system for transferring data packets from a cable modem to a network, wherein the data packets are formatted in accordance with a non-DOCSIS-compliant data transfer protocol, comprising:
    a DOCSIS-compliant cable modem termination system coupled to said cable modem via a cable network; and
    a headend server coupled to said cable modem termination system and to the network;
    wherein said cable modem termination system comprises means to receive the data packets and to transfer the data packets to said headend server in accordance with a unique hardware address of said headend server that is appended by the cable modem to the data packets; and wherein said headend server comprises means to restore a previously suppressed RTP header of the data packets in accordance with the non-DOCSIS-compliant data transfer protocol and to transfer said modified data packets to the network.

6. The cable modem system of claim 5, wherein said unique hardware address comprises an Ethernet address.

7. The cable modem system of claim 5, wherein the network comprises the Internet.

8. The cable modem system of claim 5, wherein the data packets received by said cable modem termination system have been formatted in accordance with a header suppression scheme, and wherein said headend server comprises means to restore suppressed header information to the data packets.

9. A cable modem system for transferring data from a user device to a network, comprising:
    a cable modem;
    a DOCSIS-compliant cable modem termination system coupled to said cable modem via a cable network and coupled to the network; and
    a headend server coupled to said cable modem termination system;
    wherein said cable modem comprises means to receive data packets from the user device, to modify the contents of said data packets, said modification comprising suppression of an RTP header, in accordance with a non-DOCSIS-compliant data transfer protocol, to append a unique hardware address of said headend server to said modified data packets, and to transfer said modified data packets to said cable modem termination system;
    wherein said cable modem termination system comprises means to receive said modified data packets and to transfer said modified data packets to said headend server in accordance with said unique hardware address;
    wherein said headend server comprises means to restore the contents of said modified data packets to an unmodified state and to transfer said restored data packets to said cable modem termination system;
    and wherein said cable modem termination system comprises means to receive said restored data packets and to transfer said restored data packets to the network.

10. A method for transferring data in a cable modem system, comprising:
    receiving data packets from a user device;
    modifying the contents of said data packets, said modification comprising suppression of an RTP header, in accordance with a non-DOCSIS-compliant data transfer protocol;
    appending a unique hardware address of a headend server to the modified data packets;
    transferring the modified data packets over a cable network to a DOCSIS-compliant cable modem termination system;
    wherein the cable modem termination system comprises means to transfer the modified data packets to the headend server in accordance with the unique hardware address; and
    wherein the headend server comprises means to restore the contents of said modified data packets to an unmodified state and transfer said restored data packets to a network.

11. The method of claim 10, wherein said modifying step comprises suppressing header information of said data packets, and wherein the headend server comprises means to restore the suppressed header information.

12. The method of claim 10, wherein said appending step comprises appending an Ethernet address that directs the modified data packets to the headend server.

* * * * *

UNITED STATES PATENT AND TRADEMARK OFFICE
CERTIFICATE OF CORRECTION

PATENT NO. : 7,388,884 B2  
APPLICATION NO. : 09/783403  
DATED : June 17, 2008  
INVENTOR(S) : Bunn et al.

Page 1 of 1

It is certified that error appears in the above-identified patent and that said Letters Patent is hereby corrected as shown below:

<u>Column 1</u>  
Line 18, language starting with "Voice Architecture For..." should start as a new paragraph.

<u>Column 1</u>  
Line 12, replace "Gunimalla" with --Gummalla--.

<u>Column 1</u>  
Line 20, replace "Gunimalla" with --Gummalla--.

<u>Column 1</u>  
Line 24, replace "Gunimalla" with --Gummalla--.

Signed and Sealed this

Twenty-eighth Day of October, 2008

JON W. DUDAS  
*Director of the United States Patent and Trademark Office*